United States Patent
Rankin et al.

(10) Patent No.: US 9,927,698 B2
(45) Date of Patent: Mar. 27, 2018

(54) DUAL EXPOSURE PATTERNING OF A PHOTOMASK TO PRINT A CONTACT, A VIA OR CURVILINEAR SHAPE ON AN INTEGRATED CIRCUIT

(71) Applicant: GLOBALFOUNDRIES INC., Grand Cayman (KY)

(72) Inventors: Jed H. Rankin, Richmond, VT (US); Adam C. Smith, Essex Junction, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 71 days.

(21) Appl. No.: 15/234,078

(22) Filed: Aug. 11, 2016

(65) Prior Publication Data

US 2018/0046073 A1  Feb. 15, 2018

(51) Int. Cl.

| | |
|---|---|
| G03F 1/70 | (2012.01) |
| G03F 1/78 | (2012.01) |
| G03F 1/20 | (2012.01) |
| G03F 7/20 | (2006.01) |
| H01L 21/027 | (2006.01) |
| B82Y 10/00 | (2011.01) |
| G06F 17/50 | (2006.01) |
| B82Y 40/00 | (2011.01) |
| H01J 37/317 | (2006.01) |

(52) U.S. Cl.
CPC ............. *G03F 1/70* (2013.01); *B82Y 10/00* (2013.01); *B82Y 40/00* (2013.01); *G03F 1/20* (2013.01); *G03F 1/78* (2013.01); *G03F 7/20* (2013.01); *G03F 7/2037* (2013.01); *G03F 7/2063* (2013.01); *G03F 7/7025* (2013.01); *G06F 17/50* (2013.01); *G06F 17/5068* (2013.01); *G06F 17/5081* (2013.01); *H01L 21/0274* (2013.01); *G06F 2217/12* (2013.01); *H01J 37/3174* (2013.01); *Y10S 430/143* (2013.01)

(58) Field of Classification Search
CPC ..... G03F 1/20; G03F 1/70; G03F 1/78; G03F 7/20; G03F 7/2037; G03F 7/2063; G03F 7/7025; G06F 17/50; G06F 17/5068; G06F 17/5081; G06F 2217/12; H01L 21/0274; H01J 37/3174; B82Y 10/00; B82Y 40/00; Y10S 430/143
USPC ............................................ 430/5, 296, 942
See application file for complete search history.

(56) References Cited

U.S. PATENT DOCUMENTS

| | | |
|---|---|---|
| 8,057,970 B2 | 11/2011 | Fujimura et al. |
| 8,354,207 B2 | 1/2013 | Fujimura et al. |
| 8,413,084 B2 | 4/2013 | Rankin |

OTHER PUBLICATIONS

Aki Fujimura et al., "Efficiently Writing Circular Contacts on Production Reticle", Proc. of SPIE, vol. 7748, 2010, pp. 1-7.

*Primary Examiner* — Christopher G Young
(74) *Attorney, Agent, or Firm* — Gibb & Riley, LLC; Michael J. LeStrange, Esq.

(57) ABSTRACT

A method and system for: forming a first rectangular shape with photomask writing equipment, using a first sub-threshold dosage on a photoresist layer of a photomask substrate; forming an overlapping second rectangular shape with the photomask writing equipment using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage; and forming a photomask, based on developing the exposed photoresist layer, to provide optical transmission corresponding to the one of: the hexagonal overlap area of at least the threshold dosage and the octagonal overlap area of at least the threshold dosage, for use by a photolithography system to write any of a contact, a via, or a curvilinear shape on an integrated circuit substrate.

18 Claims, 5 Drawing Sheets

500

DUAL EXPOSURE PATTERNING OF A PHOTOMASK TO PRINT A CONTACT, A VIA OR CURVILINEAR SHAPE ON AN INTEGRATED CIRCUIT

BACKGROUND

Field of Invention

The present invention relates to the manufacture of integrated circuits (ICs) and more particularly to methods and systems for improved photomask throughput and yield, by reducing exposure shot counts for shapes related to the patterning of a photomask for printing a contact, a via, or a curvilinear shape on an IC.

Description of Related Art

Photomasks represent an increasingly expensive fraction of overall semiconductor manufacturing costs. Traditionally, photomasks have accounted for less than one percent of the cost of semiconductor manufacturing. However, in the case of the frequently smaller manufacturing volumes for Application Specific Integrated Circuits (ASICs), the quantity of manufactured ICs per photomask decreases, resulting in relatively higher costs for photomask fabrication.

Following IC design, photomasks or masks are created from the physical design or layout of the IC by various processes. An electron beam may be used to write a pattern onto a photoresist-coated glass mask substrate according to mask data derived from the physical design layout. Alternatively, an optical laser system, typically in the deep ultraviolet spectrum, may be substituted for the electron beam to write the pattern onto the photoresist-coated glass mask substrate according to the mask data. Following development of the exposed photoresist, the resulting relief mask is used as an in-situ mask for etching the chrome or other mask material, to provide an optical transmission mask used by the photolithography system.

The throughput of photomask patterning is directly related to the number of exposure "shots", i.e., shot count, used to pattern the photoresist layer on the photomask substrate. Generally, two or more sub-threshold shots or "single shots" are combined to yield a composite dose of at least a threshold energy, to pattern a shape on the photomask substrate. Advantageously, the two or more sub-threshold shots or single shots allow placement and size averaging of the composite printed doses, which may then be used in photolithographic printing of the design elements of the IC. To accommodate the various polygonal shapes of the design layout, the polygonal shapes are decomposed or "fractured" into a data set of simple polygons, e.g., rectangles and 45 degree triangles of a certain size limit, appropriate to the computer-assisted design (CAD) software linked to the photomask writing equipment. Each of the "fractured" shapes produced by the data fracture algorithm requires a separate shot; thereby, significantly increasing shot count, photomask-write times and costs, as the mask design deviates from predominately "large" rectangular features.

As no change to the exposure wavelengths for creating photomasks and to the inspection wavelengths for inspecting photomasks is anticipated in the near term, and as the push to maintain Moore's Law continues to produce smaller and smaller ICs, the various polygonal shapes written to the photomask are becoming increasingly complex, requiring more ground rules or design restrictions to accommodate the desired photomask shapes, the fundamental limits of etch/resolution and critical dimension (CD) inspection problems for the photomask.

To minimize the shot-count, ideal curvilinear shapes are often "Manhattanized", or adopted to fit a predominately "manhattan" or orthogonal framework. In the case of printing contacts, vias, or other interconnect shapes, the "manhattanization" often changes the target curvilinear shape to a simple square or rectangle.

There remains a need to efficiently create desired photomask shapes, given the constraints of existing technology.

SUMMARY

In an embodiment of the disclosure, a method includes forming a first rectangular shape with photomask writing equipment, using a first sub-threshold dosage of an energy beam on a photoresist layer of a photomask substrate; forming an overlapping second rectangular shape with the photomask writing equipment using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage; and forming a photomask, based on developing the exposed photoresist layer, to provide optical transmission corresponding to the one of: the hexagonal overlap area and the octagonal overlap area, for use by a photolithography system to print any of a contact, a via, and a curvilinear shape on an integrated circuit substrate.

In another embodiment of the disclosure, a method includes forming a first square shape with photomask writing equipment, using a first sub-threshold dosage of an energy beam on a photoresist layer of a photomask substrate; forming an overlapping second square shape equal in size to the first square shape with the photomask writing equipment using a second sub-threshold dosage on the photoresist layer, the second square shape being rotated relative to the first square shape to form a regular octagonal overlap area, that exposes the photoresist layer to at least a threshold dosage; and forming a photomask, based on developing the exposed photoresist layer, to provide optical transmission corresponding to the regular octagonal overlap area, which closely approximates a circle, for use by a photolithography system to print any of a contact, a via, and a curvilinear shape on an integrated circuit substrate.

In yet another embodiment of the disclosure, a system includes integrated circuit (IC) design software the provides a physical layout of any of a contact, a via, and a curvilinear shape; and photomask writing equipment that: forms a first rectangular shape using a first sub-threshold dosage of an energy beam on a photoresist layer of a photomask substrate, based on the physical layout; forms an overlapping second rectangular shape using a second sub-threshold dosage on the photoresist layer, the second rectangular shape being rotated relative to the first rectangular shape to form one of: a hexagonal overlap area of at least a threshold dosage and an octagonal overlap area of at least the threshold dosage, that exposes the photoresist layer, based on the physical layout; and forms a photomask, based on developing the exposed photoresist layer, to provide optical transmission corresponding to the one of: the hexagonal overlap area of at least the threshold dosage and the octagonal overlap area of at least the threshold dosage, for use by a photolithography system to print any of a contact and a via on an integrated circuit substrate.

BRIEF DESCRIPTION OF THE DRAWINGS

The embodiments herein will be better understood from the following detailed description with reference to the drawings, which are not necessarily drawn to scale and in which.

DETAILED DESCRIPTION

As stated above, there remains a need to efficiently create desired photomask shapes, given the constraints of existing technology.

Contacts and vias are ubiquitous design elements for every integrated circuit (IC). Ideally, the target shape for contacts and vias would consist of either circles or ellipses, which can increase the packing density of design elements by decreasing the diagonal distance between the design elements on the physical layout. However, writing circles or ellipses with photomask writing equipment is problematic. A Gaussian electron beam can write circles, but Gaussian beams are not compatible with most high-end photomask writing equipment for 20 nm and 14 nm technology nodes. Circular apertures, which could be used by the photomask writing equipment, are still in the concept stage for the 20 nm and 14 nm technology nodes and are not available commercially without significant compromises in quality. Conventionally, data fracture of circular or elliptical photomask design elements requires at least three overlapping sub-threshold shots when the printing equipment is compatible with overlapping shots. In equipment not allowing overlapping shots, producing a shape that approximates a circle on a photomask can require up to 50 or more unique shots. In a typical IC, millions of contacts and vias may for formed; hence, any reduction in the shot count to form contacts and vias may significantly reduce write times and costs.

Figure 1A:
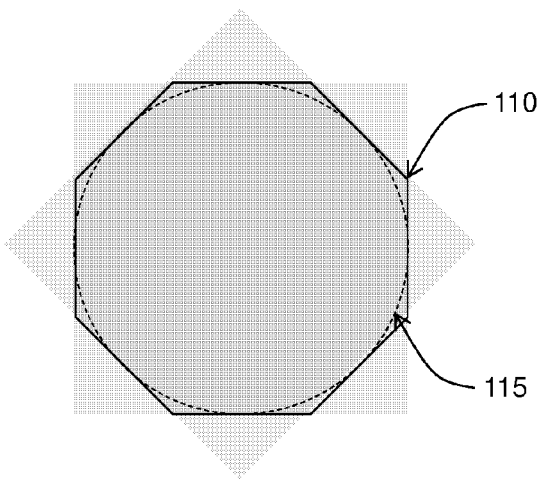
FIG. 1A is a schematic diagram illustrating two overlapping sub-threshold square shots or exposures of equal size, with one of the two overlapping sub-threshold square shots being rotated, to pattern at least a threshold shot of a regular octagonal shape, which may closely approximate a circle, to a photoresist on a photomask substrate in an embodiment herein.
Figure 1B:
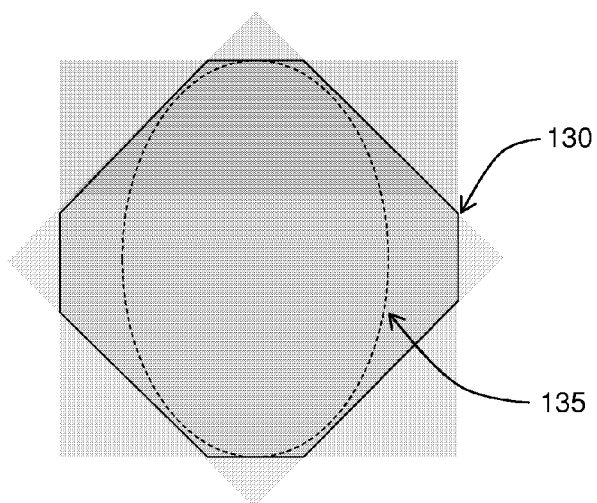
FIG. 1B is a schematic diagram illustrating two overlapping sub-threshold square shots or exposures of unequal size, with one of the two overlapping sub-threshold square shots being rotated, to pattern at least a threshold shot of an irregular octagonal shape, which may approximate an ellipse, to a photoresist on a photomask substrate in an embodiment herein.
Figure 1C:
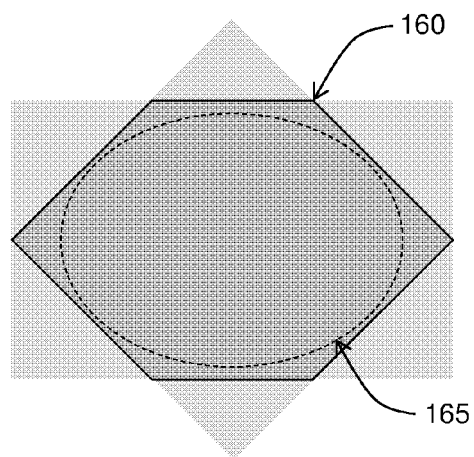
FIG. 1C is a schematic diagram illustrating two overlapping sub-threshold shots consisting of a square shot and a non-square rectangular shot, with one of the two overlapping sub-threshold shots being rotated, to pattern at least a threshold shot of an irregular hexagonal shape, which may approximate an ellipse, to a photoresist on a photomask substrate in an embodiment herein.

Referring to FIGS. 1A, 1B and 1C, an exemplary embodiment of the invention may use only two overlapping sub-threshold rectangular shots or exposures, with one of the two overlapping sub-threshold rectangular shots being rotated approximately 45 degrees, i.e., from 40 degrees to 50 degrees, with respect to the other overlapping sub-threshold rectangular shot or exposure, to write one of: an at least threshold dosage of an octagonal shape, which may closely approximate a circular shape, an elliptical shape, or a curvilinear shape, and an least threshold dosage of a hexagonal shape, which may also approximate an elliptical shape or a curvilinear shape, to a photoresist on a photomask substrate.

As illustrated in FIG. 1A, when each of the two overlapping sub-threshold rectangular shots or exposures consists of square shots of an equal size with one of the two lapping sub-threshold square shots being rotated approximately 45 degrees, an at least threshold dosage of a regular octagon 110, which closely approximates a circular shape 115, may be written by the photomask writing equipment with only two shots, one for each sub-threshold square shot, to the photoresist on the photomask substrate. Each of the two overlapping sub-threshold square shots may have equal or unequal sub-threshold dosages, while the overlapping area of the regular octagon includes a threshold or supra-threshold dosage, provided by adding each of the two sub-threshold dosages. Following development of the exposed overlapping area of the regular octagon on the photoresist, a photomask may be formed that provides optical transmission corresponding to the overlapping area of the regular octagon for use by a photolithography system in forming contacts and/or vias on an IC substrate.

As illustrated in FIG. 1B, when each of the two overlapping sub-threshold rectangular shots or exposures consists of square shots of an unequal size with one of the two lapping sub-threshold square shots being rotated approximately 45 degrees, i.e., from 40 degrees to 50 degrees, an at least threshold dosage of an irregular octagon 130, which approximates an elliptical shape 135, may be written by the photomask writing equipment with only two shots, one for each sub-threshold square shot, to the photoresist on the photomask substrate. Each of the two overlapping sub-threshold square shots may have equal or unequal sub-threshold dosages, while the overlapping area of the irregular octagon includes a threshold or supra-threshold dosage, provided by adding each of the two sub-threshold dosages. Following development of the exposed overlapping area of the irregular octagon on the photoresist, a photomask may be formed that provides optical transmission corresponding to the overlapping area of the at least threshold dosage of the irregular octagon for use by a photolithography system in forming contacts and/or vias on an IC substrate.

As illustrated in FIG. 1C, when the two overlapping sub-threshold shots or exposures consist of a square shot and a non-square rectangular shot with one of the two overlapping sub-threshold shots being rotated approximately 45 degrees, i.e., from 40 degrees to 50 degrees, a threshold or supra-threshold irregular hexagon 160, which approximates an elliptical shape 165, may be written by the photomask writing equipment with only two shots, one for each sub-threshold shot, to the photoresist on the photomask substrate. Each of the two overlapping sub-threshold shots may have equal or unequal sub-threshold dosages, while the overlapping area of the irregular hexagon includes a threshold or supra-threshold dosage, provided by adding each of the two sub-threshold dosages. Following development of the exposed overlapping area of the irregular hexagon on the photoresist, a photomask may be formed that provides optical transmission corresponding to the overlapping area of the irregular hexagon for use by a photolithography system in forming contacts and/or vias on an IC substrate.

Figure 2A:
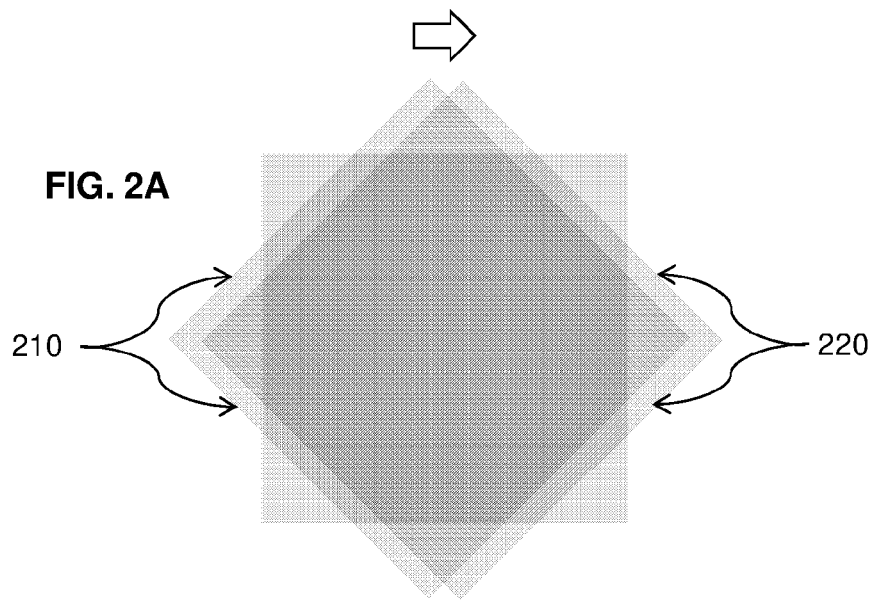
FIG. 2A is a schematic diagram illustrating the effect upon the overlapping area of at least a threshold exposure when two overlapping rectangular sub-threshold exposures are misaligned in an embodiment herein.
Figure 2B:
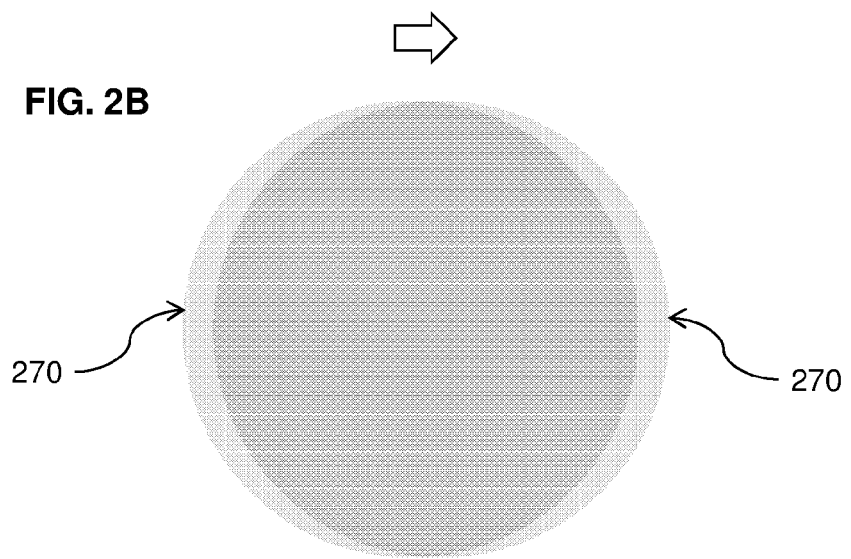
FIG. 2B is a schematic diagram illustrating the effect upon the overlapping area of at least a threshold exposure when two overlapping circular sub-threshold exposures are misaligned in the related art.

Referring to FIGS. 2A and 2B, an aspect of an embodiment of the invention shows less effect upon the overlapping area of exposure when two overlapping rectangular exposures are misaligned, than that of using two misaligned overlapping circular exposures. In FIG. 2A, if, for example a second rectangular sub-threshold shot or exposure is misaligned with the first rectangular sub-threshold shot, the overlapping area lost by, for example, a rightward shift of the second rectangular sub-threshold shot, i.e., lost area 210, is re-gained by the gained area 220. In contrast, FIG. 2B illustrates a misalignment error of a second circular shot that is shifted to the right with respect to a first circular shot, producing a loss of overlapping area 270 on each lateral side of the twice-exposed central area with no compensatory gain.

Figure 3:
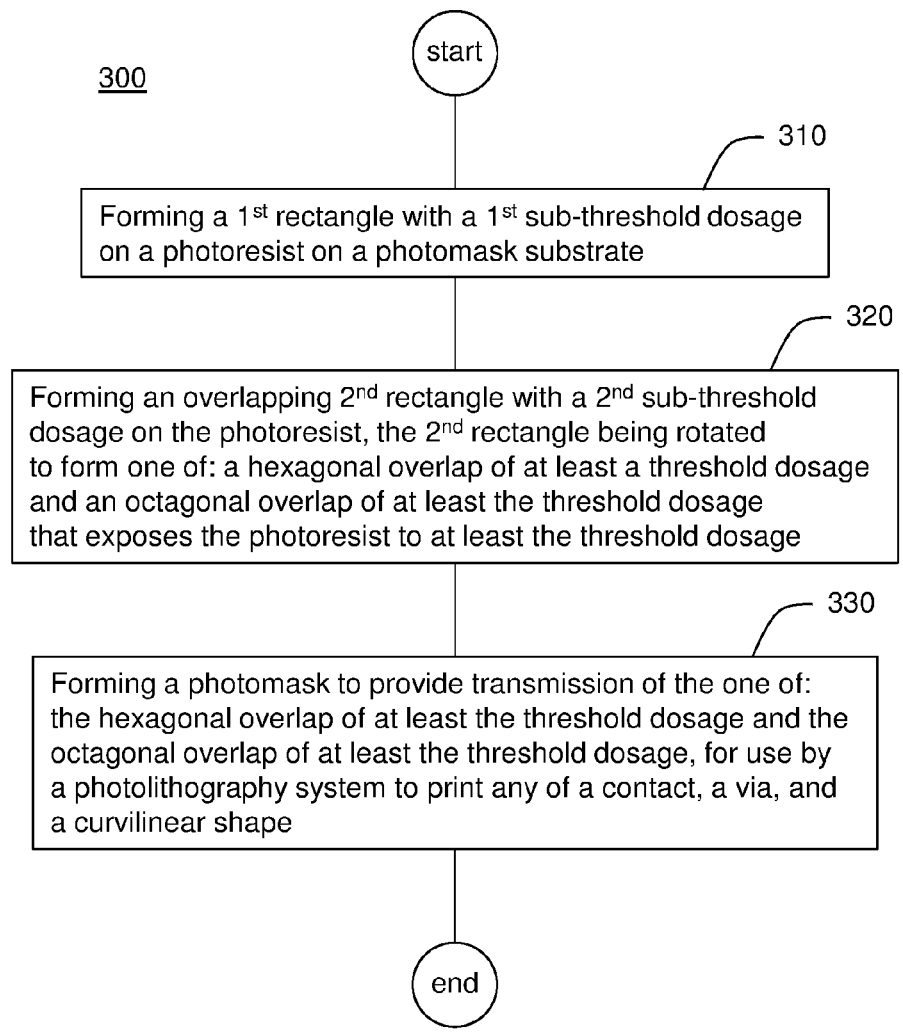
FIG. 3 is a flowchart of a method to write one of: a hexagonal overlap area of at least a threshold dosage and an octagonal overlap area of at least a threshold dosage, that exposes the photoresist layer on a photomask substrate in an embodiment herein.

Referring to the flowchart 300 of FIG. 3, an exemplary method to write one of: a hexagonal overlap area and an octagonal overlap area, that exposes the photoresist layer on a photomask substrate to at least a threshold dosage may include: forming a first rectangular shape with photomask writing equipment, using a first sub-threshold dosage of an energy beam on a photoresist layer of a photomask substrate, 310; forming an overlapping second rectangular shape with the photomask writing equipment using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage, 320; and forming a photomask, based on developing the exposed photoresist layer to provide optical transmission corresponding to the one of: the hexagonal overlap area of at least the threshold dosage and the octagonal overlap area of at least the threshold dosage, for use by a photolithography system to print any of a contact, a via, and a curvilinear shape on an integrated circuit substrate, 330. The energy beam used by the method may include one of: electrons and photons. The forming of the photomask in the method may result from the exposed photoresist layer being used as a relief mask to etch a photomask material to provide the photomask used by the photolithography system. In the method, the first rectangular shape and the second rectangular shape may include squares of equal size, resulting in the octagonal overlap area forming a regular octagon, which approximates a circle. In the method, the first rectangular shape and the second rectangular shape may include squares of unequal size, resulting in the octagonal overlap area forming an irregular octagon, which more closely approximates an ellipse. In the method, one of the first rectangular shape and the second rectangular shape may include a square and the other of the first rectangular shape and the second rectangular shape may include a non-square rectangle, resulting in the hexagonal overlap area, which approximates an ellipse.

Figure 4:
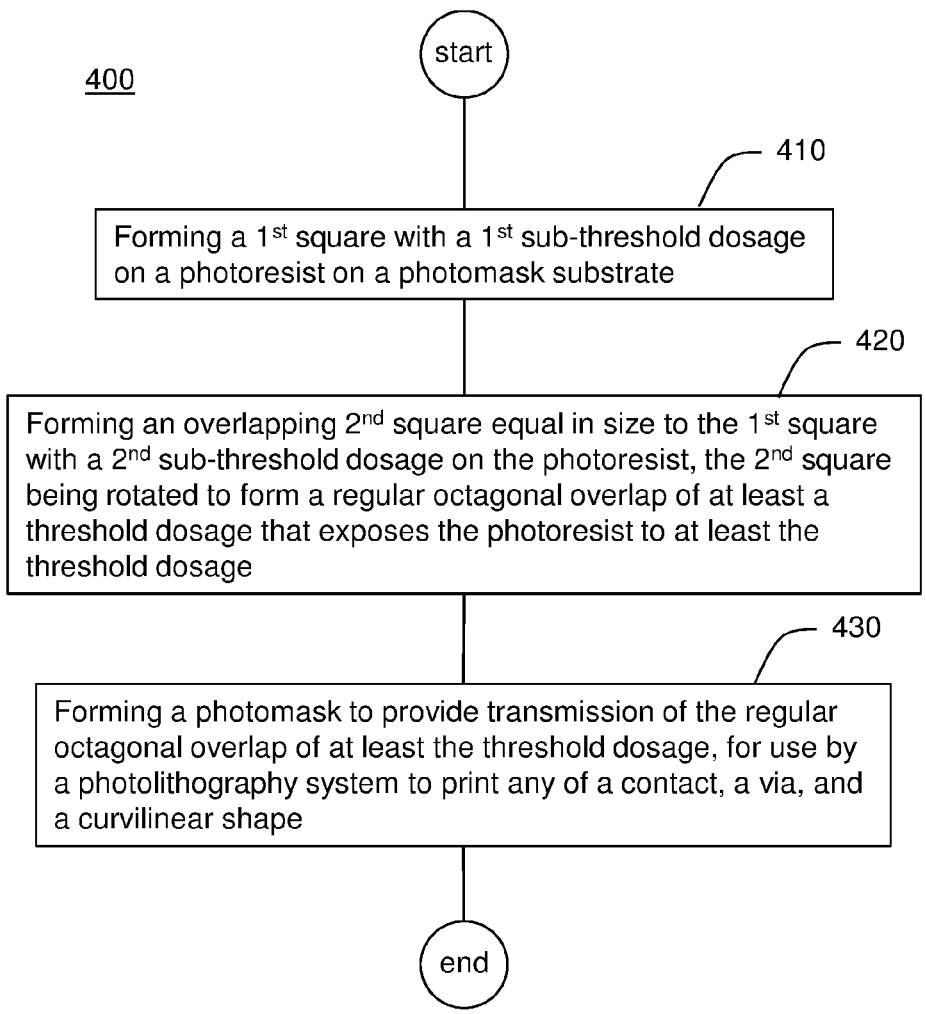
FIG. 4 is a flowchart of a method to write a regular octagonal overlap area of at least a threshold dosage, which closely approximates a circle, to expose the photoresist layer on a photomask substrate in an embodiment herein.

Referring to the flowchart 400 of FIG. 4, an exemplary method to write a regular octagonal overlap area, which closely approximates a circle, to expose the photoresist layer on a photomask substrate to at least a threshold dosage may include: forming a first square shape with photomask writing equipment, using a first sub-threshold dosage of an energy beam on a photoresist layer of a photomask substrate, 410; forming an overlapping second square shape equal in size to the first square shape with the photomask writing equipment using a second sub-threshold dosage on the photoresist layer, the second square shape being rotated relative to the first square shape to form a regular octagonal overlap area, that exposes the photoresist layer to at least a threshold dosage, 420; and forming a photomask, based on developing the exposed photoresist layer, to provide optical transmission corresponding to at least the threshold dosage of the regular octagonal overlap area, which closely approximates a circle, for use by a photolithography system to print any of a contact, a via, and a curvilinear shape on an integrated circuit substrate, 430.

Figure 5:
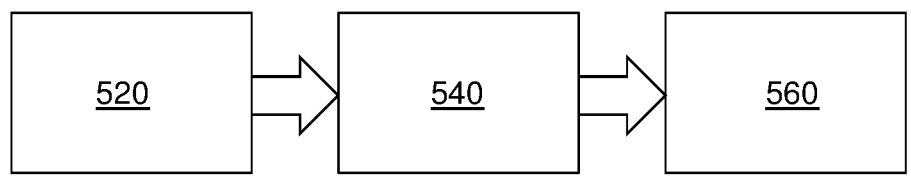
FIG. 5 is a schematic diagram illustrating a system to perform the method of writing one of: a hexagonal overlap area of at least a threshold dosage and an octagonal overlap area of at least a threshold dosage, that exposes the photoresist layer on a photomask substrate in an embodiment herein.

Referring to FIG. 5, a schematic diagram illustrating an embodiment of a system of the invention may include: integrated circuit (IC) design software 520 the provides a physical layout of any of a contact, a via, and a curvilinear shape; and photomask writing equipment 540 that: forms a first rectangular shape using a first sub-threshold dosage of an energy beam on a photoresist layer of a photomask substrate, based on the physical layout; forms an overlapping second rectangular shape using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage, based on the physical layout; and forms a photomask 560, based on developing the exposed photoresist layer, to provide optical transmission corresponding to the one of: the hexagonal overlap area of at least the threshold dosage and the octagonal overlap area of the at least the threshold dosage, for use by a photolithography system to print any of a contact, a via, and a curvilinear shape on an integrated circuit substrate. The energy beam of the photomask writing equipment 540 may include one of: electrons and photons. The photomask 560 may be formed from the exposed photoresist layer being used as a relief mask to etch a photomask material.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    forming a first rectangular shape with photomask writing equipment, using a first sub-threshold dosage of an energy beam on a photoresist layer of a photomask substrate;
    forming an overlapping second rectangular shape with the photomask writing equipment using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage; and
    forming a photomask, based on developing the exposed photoresist layer, to provide optical transmission corresponding to the one of: the hexagonal overlap area of at least the threshold dosage and the octagonal overlap area of at least the threshold dosage.

2. The method of claim 1 further comprising using the photomask in a photolithography system to print any of a contact, a via, and a curvilinear shape on an integrated circuit substrate.

3. The method of claim 1, the energy beam comprising one of: electrons and photons.

4. The method of claim 1, the forming of the photomask resulting from the exposed photoresist layer being used as a relief mask to etch a photomask material to provide the photomask used by the photolithography system.

5. The method of claim 1, the first rectangular shape and the second rectangular shape comprising squares of equal size, resulting in the octagonal overlap area forming a regular octagon, which approximates a circle.

6. The method of claim 1, the first rectangular shape and the second rectangular shape comprising squares of unequal size that result in the octagonal overlap area, which forms an irregular octagon more closely approximating an ellipse.

7. The method of claim 1, one of the first rectangular shape and the second rectangular shape comprising a square and the other of the first rectangular shape and the second rectangular shape comprising a non-square rectangle, resulting in the hexagonal overlap area, which approximates an ellipse.

8. A method, comprising:
    forming a first square shape with photomask writing equipment, using a first sub-threshold dosage of an energy beam on a photoresist layer of a photomask substrate;
    forming an overlapping second square shape equal in size to the first square shape with the photomask writing equipment using a second sub-threshold dosage on the photoresist layer, the second square shape being rotated relative to the first square shape to form a regular octagonal overlap area, that exposes the photoresist layer to at least a threshold dosage; and
    forming a photomask, based on developing the exposed photoresist layer, to provide optical transmission corresponding to the regular octagonal overlap area of at least the threshold dosage, which closely approximates a circle.

9. The method of claim 8 further comprising using the photomask in a photolithography system to print any of a contact, a via, and a curvilinear shape on an integrated circuit substrate.

10. The method of claim 8, the energy beam comprising one of: electrons and photons.

11. The method of claim 8, the forming of the photomask resulting from the exposed photoresist layer being used as a relief mask to etch a photomask material to provide the photomask used by the photolithography system.

12. A system, comprising:
    integrated circuit (IC) design software that provides a physical layout of any of a contact, a via, and a curvilinear shape; and
    photomask writing equipment that:
        forms a first rectangular shape using a first sub-threshold dosage of an energy beam on a photoresist layer of a photomask substrate, based on the physical layout;
        forms an overlapping second rectangular shape using a second sub-threshold dosage on the photoresist layer, the second rectangular shape being rotated relative to the first rectangular shape to form one of: a hexagonal overlap area and an octagonal overlap area, that exposes the photoresist layer to at least a threshold dosage, based on the physical layout; and
        forms a photomask, based on developing the exposed photoresist layer, to provide optical transmission corresponding to the one of: the hexagonal overlap area of at least the threshold dosage and the octagonal overlap area of at least the threshold dosage.

13. The system of claim 12, the photomask being used in a photolithography system to print any of a contact, a via, and a curvilinear shape on an integrated circuit substrate.

14. The system of claim 12, the energy beam comprising one of: electrons and photons.

15. The system of claim 12, forming of the photomask resulting from the exposed photoresist layer being used as a relief mask to etch a photomask material to provide the photomask used by the photolithography system.

16. The system of claim 12, the first rectangular shape and the second rectangular shape comprising squares of equal size, resulting in the octagonal overlap area forming a regular octagon, which approximates a circle.

17. The system of claim 12, the first rectangular shape and the second rectangular shape comprising squares of unequal size that result in the octagonal overlap area, which forms an irregular octagon more closely approximating an ellipse.

18. The system of claim 12, one of the first rectangular shape and the second rectangular shape comprising a square and the other of the first rectangular shape and the second rectangular shape comprising a non-square rectangle, resulting in the hexagonal overlap area, which approximates an ellipse.

* * * * *